United States Patent
Holmgren et al.

(10) Patent No.: US 7,377,232 B2
(45) Date of Patent: May 27, 2008

(54) METHOD AND APPARATUS FOR TREATING THE TEATS OF AN ANIMAL

(75) Inventors: Hans Holmgren, Tumba (SE); Matts Lenart Nilsson, Tumba (SE); Björn Johansson, Sätergårdsvägen (SE)

(73) Assignee: Delaval Holding A.B., Tumba (SE)

( * ) Notice: Subject to any disclaimer, the term of this patent is extended or adjusted under 35 U.S.C. 154(b) by 0 days.

(21) Appl. No.: 10/297,826

(22) PCT Filed: May 17, 2001

(86) PCT No.: PCT/EP01/05785

§ 371 (c)(1),
(2), (4) Date: Dec. 11, 2002

(87) PCT Pub. No.: WO01/97603

PCT Pub. Date: Dec. 27, 2001

(65) Prior Publication Data

US 2004/0025802 A1    Feb. 12, 2004

(30) Foreign Application Priority Data

Jun. 22, 2000 (EP) .................................. 00305277

(51) Int. Cl.
*A01K 1/12* (2006.01)

(52) U.S. Cl. ................. 119/670; 119/14.02; 119/14.03; 119/651

(58) Field of Classification Search ............. 119/14.02, 119/14.03, 651, 663, 665, 670, 673, 674, 119/675, 676
See application file for complete search history.

(56) References Cited

U.S. PATENT DOCUMENTS

| 4,867,103 A |   | 9/1989 | Montalescot et al. |
|---|---|---|---|
| 4,924,809 A | * | 5/1990 | Verbrugge ............... 119/14.02 |
| 5,042,428 A | * | 8/1991 | Van der Lely et al. ... 119/14.08 |

(Continued)

FOREIGN PATENT DOCUMENTS

EP        0306579        3/1989

(Continued)

OTHER PUBLICATIONS

"Prospects for Automatic Milking", pp. 31, 81-83, Proceedings of the International Symposium on Prospects for Automatic Milking, Nov. 23-25, 1992, Pudoc Scientific Publishers, Wageningen, Netherlands 1992.

(Continued)

*Primary Examiner*—David J Parsley
(74) *Attorney, Agent, or Firm*—Stinson Morrison Hecker LLP

(57) ABSTRACT

In an automatic milking installation including a robot arm (2) with a gripper (3) for attaching teat cups (4) to the teats of an animal, e.g. a cow, to be milked, for applying a teat dip to the teats after milking different members, such as spray nozzles (5a, 5b), dipping cups (5c, 5d) and sponge or cloth rollers (5e), are provided for applying different teat dip compositions. Under the control of a computer, the robot arm collects the member (5) appropriate for supplying the selected composition and takes it to a position appropriate for application of that composition. The selection can e effected in dependence upon the teat skin condition, e.g. detected by a camera (15) and/or environmental conditions.

32 Claims, 2 Drawing Sheets

U.S. PATENT DOCUMENTS

| | | | |
|---|---|---|---|
| 5,211,132 A * | 5/1993 | Farina et al. | 119/664 |
| 5,383,423 A * | 1/1995 | van der Lely | 119/673 |
| 5,390,627 A * | 2/1995 | van der Berg et al. | 119/14.08 |
| 5,685,262 A * | 11/1997 | Stevenson | 119/651 |
| 5,722,343 A * | 3/1998 | Aurik et al. | 119/14.02 |
| 5,862,776 A * | 1/1999 | van den Berg | 119/14.1 |
| 5,931,115 A * | 8/1999 | Lind et al. | 119/14.02 |
| 5,934,220 A | 8/1999 | Hall et al. | |
| 5,979,359 A * | 11/1999 | Hansson | 119/14.08 |
| 6,055,930 A * | 5/2000 | Stein et al. | 119/14.08 |
| 6,155,204 A * | 12/2000 | van der Lely et al. | 119/14.02 |
| 6,167,839 B1 * | 1/2001 | Isaksson et al. | 119/14.08 |
| 6,189,486 B1 * | 2/2001 | Lindholm | 119/14.02 |
| 6,213,051 B1 * | 4/2001 | Fransen | 119/14.08 |
| 6,234,109 B1 * | 5/2001 | Andersson et al. | 119/14.08 |
| 6,279,507 B1 * | 8/2001 | van der Lely et al. | 119/14.01 |
| 6,363,883 B1 * | 4/2002 | Birk | 119/14.08 |
| 6,463,877 B1 * | 10/2002 | van der Lely | 119/14.08 |

FOREIGN PATENT DOCUMENTS

| | | |
|---|---|---|
| EP | 0535754 | 4/1993 |
| EP | 0801893 | 10/1997 |
| EP | 0882393 | 12/1998 |
| EP | 0945055 A1 | 9/1999 |
| EP | 0945057 | 9/1999 |
| EP | 0749682 B1 | 12/1999 |
| WO | WO 96/11567 | 4/1996 |
| WO | WO 99/27775 | 6/1999 |
| WO | WO 9959400 A1 | 11/1999 |
| WO | WO 00/04768 | 2/2000 |
| WO | WO 0004767 A1 | 2/2000 |
| WO | WO 00/11933 | 3/2000 |
| WO | WO 0011933 A1 | 3/2000 |
| WO | WO 01/17337 | 3/2001 |

OTHER PUBLICATIONS

"Teat Disinfection Facts", National Mastitis Council Factsheet, revised Jan. 1999.

"Handbook Melkveehouderij", 1987, Wageningen a.o., pp. 302, 326-328. (In Dutch).

* cited by examiner

METHOD AND APPARATUS FOR TREATING THE TEATS OF AN ANIMAL

CROSS-REFERENCE TO RELATED APPLICATIONS

This application is a national application filed under 35 U.S.C. §371 as a national phase of international application PCT/EP01/05785. Priority is claimed pursuant to 35 U.S.C. §119 from European application No. 00305277.6, filed Jun. 22, 2000.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention is concerned with the treatment of animal teats, especially but not necessarily exclusively in connection with a milking operation, the treatment involving the application of a topical substance to the outer skin surfaces of the teats. The invention is applicable in particular to the application of a teat dip to the teats of an animal at the end of an automatic milking procedure when the teat cups used for milking have been removed, although the invention could also be employed, for example, for treating animal teats as a preliminary step prior to milking, if this was desirable.

2. Description of Related Art

A primary purpose for applying a teat dip to the teats of an animal is to guard against infection, especially mastitis to which milking animals are susceptible, and teat dips comprising a disinfectant are well known. However, teat dips can also have other functions, such as to protect the teats against environmental conditions, such as intense sun or prolonged wetness, or to condition the teats, for example by skin moisturising, to combat the detrimental effects which can be suffered as a consequence of repeated milking in an automatic milking plant. It can also in some cases be beneficial for the teat dip to include a medication for treating skin injuries or ailments. There can as a consequence be varying demands with respect to a teat dip composition, possibly from one animal to another in the same herd or even between different teats of the same animals, or at different times of milking of the same animal.

In recent times fully automatic milking machines have been developed which are capable of milking animals, cows in particular, without requiring any personnel to be present. These automatic milking machines generally comprise a robot arm which attaches the teat cups to the respective teats of the udder of the cow. When not in use the teat cups can be held in a storage rack, e.g. as disclosed in WO-A-00/04767, or they can be carried on the robot arm, e.g. as described in EP-A-0535754. It has been proposed to include in a robotic milking machine a spray device which can be operated to spray liquid disinfectant onto the teats, or over the entire udder of a cow, after the cow has been milked. Thus, in the robot arm described in EP-A-0535754 a spray nozzle is fixedly mounted on the robot arm and is actuated to produce a flat spray of liquid which is directed across the udder. WO-A-00/04767 on the other hand has a spray device which is normally positioned on a holding rack and is collected by the robot arm when the teats are to be sprayed. These known teat spraying arrangements have a drawback in that they provide only for all cows milked in the same stall to have their udders/teats sprayed with the same liquid, and the nozzles are adapted to spray liquids with certain properties and allow little scope for modifying the teat dip composition in accordance with particular requirements.

BRIEF SUMMARY OF THE INVENTION

The aim of the present invention is to eliminate, or at least alleviate this drawback by providing far greater choice and versatility in teat treatment, with a view to maintaining animal teats in good and healthy condition. In accordance with the invention there is provided an apparatus for applying a topical composition to at least a part of an udder, in particular a teat, of an animal, comprising a robot arm, and a composition applying member positionable by the robot arm for applying the topical composition to the teat, characterised in that a plurality of composition applying members are provided for applying different respective topical compositions, and a control device is operable for a selected one of the plurality of composition applying members to be positioned by the robot arm with respect to the teat to be treated and to apply the respective topical composition to the teat.

Most conveniently the robot arm is the same robot arm as that used to attach teat cups to the teats of an animal in an automatic milking installation, but a separate robot arm could be used if desired.

It is possible for a plurality of composition applying members, especially spray nozzles, to be fixedly mounted on the robot arm, with a respective spray nozzle being actuated when selected for applying the particular composition delivered through that nozzle. Of course, the nozzles would then be connected to respective supplies of different topical compositions. In a preferred embodiment, however, the robot arm is arranged to collect the selected composition applying member from a predetermined standby location and to return the composition applying member to the standby location when the teat treatment is completed. Conveniently, the robot arm is equipped with a gripping device operable to grasp and release the selected composition applying member in accordance with programmed control of the robot arm. With this embodiment one or more of the composition applying members may comprise a spray nozzle, but it is also convenient for use of a composition applying member comprising a container, in particular a dipping cup or bottle, containing the composition to be applied and into which the teat is dipped by manipulating the container so that the teat is inserted through an opening therein and becomes immersed in the container contents. A dipping device of this form can be used to apply a greater variety of topical compositions than can be applied effectively through a spray nozzle such compositions including lotions, creams, sun screens, etc as well as the liquids which are also suitable for application by spraying. It has, for example, been found that a teat dip consisting of a greasy liquid can be beneficial when applied to the teats of frequently milked cows, especially during hot climatic conditions when the teats can be exposed to intense sun, and greasy liquids do not lend themselves to spraying. Of course, it is possible for an apparatus according to the invention to include one composition applying member in the form of a spray nozzle for applying a liquid of relatively low viscosity and another composition applying member in the form of a dipping container for applying a more viscous teat dip composition. Furthermore, composition applying members of other kinds can be used also, including a wiping element, e.g. comprising a cloth or sponge, which may be impregnated with or carry, for example, a viscid composition of udder grease which is applied by wiping the teat.

Having regard to the foregoing the present invention also resides in an automatic milking installation for milking animals, comprising a robot arm having a gripper for collecting teat cups from locations at which the teat cups are positioned when not being used for milking and attaching the teat cups to the teats of animal to be milked, a dipping container for holding a composition to be applied to a teat of the animal after completion of milking the animal and having an opening through which the teat is insertable into the container to be immersed in the container contents, and a support for positioning the dipping container in a predetermined standby location, the dipping container being arranged to be grasped by the gripper and to be moved by the robot arm between the standby position and a position in which the container is applied over the teat to be treated with the teat inserted into the container opening.

The present invention also provides an apparatus for applying a topical composition to at least a part of an udder, in particular a teat, of an animal, comprising a robot arm and a composition applying means positionable by the robot arm for applying the topical composition to the teat, characterised in that the composition applying means are operable to apply different topical compositions, and a control device is arranged to control the robot arm and composition applying means for a selected topical composition to be applied to a teat in accordance with information relating the animal and/or environmental conditions.

In accordance with a further aspect the present invention provides a method of treating at least a part of an udder, in particular a teat, of an animal by applying a topical composition thereto, the method comprising the steps of positioning a composition applying member by means of a robot arm for applying the topical composition to the teat, and applying the composition, characterised in that the composition applying member is selected from a plurality of composition applying members each for applying a different respective topical composition.

As indicated above, the composition applying members may have respective standby locations with the selection of the particular member to be used to treat a teat being effected by the robot arm collecting that member from its standby location, to which it is then returned by the robot arm when the teat treatment is completed. It is possible for two or more of the composition applying members to be incorporated in a common unit, which unit is collected from a standby location when a composition applying member incorporated therein is to be used to treat a teat, and the control device then ensuring that the correct composition applying member incorporating in the common unit is operated to apply the selected topical composition. Which composition applying member, and hence which topical composition, is to be selected for treatment of the teat of an animal may be determined, conveniently by the control device, in accordance with data relating to that specific animal. Thus, information relating to individual cows may be gathered, suitably at the times that the cows are milked, and stored, e.g. in a computer, for use in deciding which teat dip composition should be applied after the next milking. More especially, information on the skin conditions of the teats of the animals can be gathered by a sensing device, which may conveniently comprise a camera. A picture analysis carried out on the camera output can be employed to detect teat inflammation and/or traumas, including various skin irritations such as rashes or cracks, which can be a cause of distress to an animal especially during milking. Additionally or alternatively, data relating to the environment of the animals, in particular prevailing climate conditions, may be stored and used as a basis for selecting the topical composition, and thereby the corresponding composition applying member to be utilised for treatment of the teats of an animal. Parameters relating to the surrounding environment which may be taken into account in this context include, temperature, air humidity, sun intensity and others. A computer can be programmed to make the most appropriate selection of the topical composition to be applied, and thereby the composition applying member to be used to apply it to a teat. Although it is possible to make a single selection for all the teats of one animal, the invention includes making a separate selection for each teat, which can be advantageous since not all teats of the same udder will suffer the same injuries and infections and each teat can then be treated in the most beneficial way for the subsisting conditions of that individual teat.

In one particular application of the method and apparatus of the invention the control device could be programmed to apply one topical composition to the teats of an animal after certain milking occasions and to apply another topical composition at other milking occasions. This will be appropriate for example if teats require treatment by a particular teat dip composition only periodically. According to another embodiment one teat dip composition could be applied during summer conditions and another could be applied during winter conditions.

Also within the scope of the present invention is a method of treating at least a part of an udder, in particular a tea, of an animal by applying a topical composition thereto, the method comprising the steps of positioning a composition applying means for applying the topical composition to the teat, and applying the composition, characterised in that different topical compositions are provided and are applicable by the composition applying means, a topical composition is selected for application to a teat in dependence upon information relating to the animal and/or environmental conditions, and the composition applying means is operated to apply the selected topical composition.

BRIEF DESCRIPTION OF THE SEVERAL VIEWS OF THE DRAWINGS

To facilitate a clear understanding of the invention an embodiment of a milking plant in accordance with the invention, and its operation, will now be described in more detail with reference being made to the accompanying drawings in which:—

DETAILED DESCRIPTION OF THE INVENTION

Figure 1:
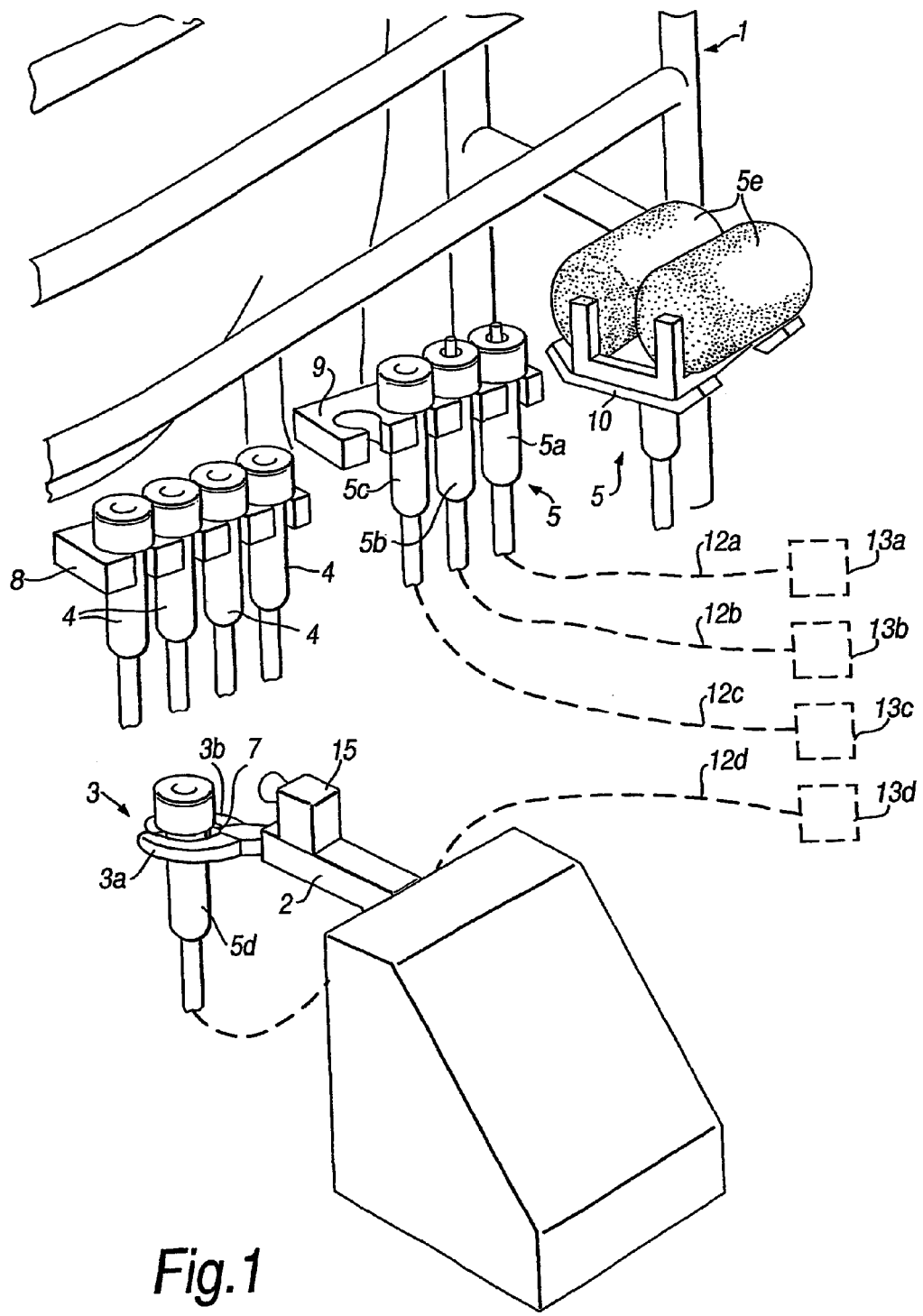
FIG. 1 is a schematic perspective view of part of a milking stall in an automatic milking installation.

The milking installation represented in FIG. 1 comprises a milking stall 1 in which a cow stands during a milking operation. Disposed alongside the stall is a robot with a robot arm 2 provided at its free end with a gripper 3 having a pair of jaws 3a, 3b which are controllable for the gripper to grasp and release objects positioned between the jaws, including teat cups 4 which are attached to the respective teats of the udder of the cow during milking, and topical composition applying members 5 described in more detail below. A holding rack 8 is disposed at the side of the stall 1 and serves to support the four teat cups 4 when they are not in use, the robot arm being operable to collect each of the teat cups 4 in turn from the rack 8 and to attach them to the respective teats of the cow. At the end of milking the teat cups can be returned to the rack 8 by the robot arm or alternatively a separate retraction mechanism can be used as known per se.

Also mounted at the side of the milking stall 1 is a second rack 9 which supports the teat dip applying members 5 in predetermined standby locations ready for use when required. As illustrated there are two spray nozzles 5a, 5b operable to apply relatively low viscosity liquid teat dip by spraying the teats and/or the whole udder, and two dipping cups 5c, 5d which can be used to apply low viscosity liquid teat dips or more viscous teat dips such as greasy liquids, or lotions which can not be easily applied by spraying. Shown supported on a separate bracket 10 at the side of the milking stall 1 is a further topical composition applying member which comprises a pair of sponge or cloth rollers 5e adapted for use in applying a composition such as an udder grease by a wiping action against the teats.

Figure 2:
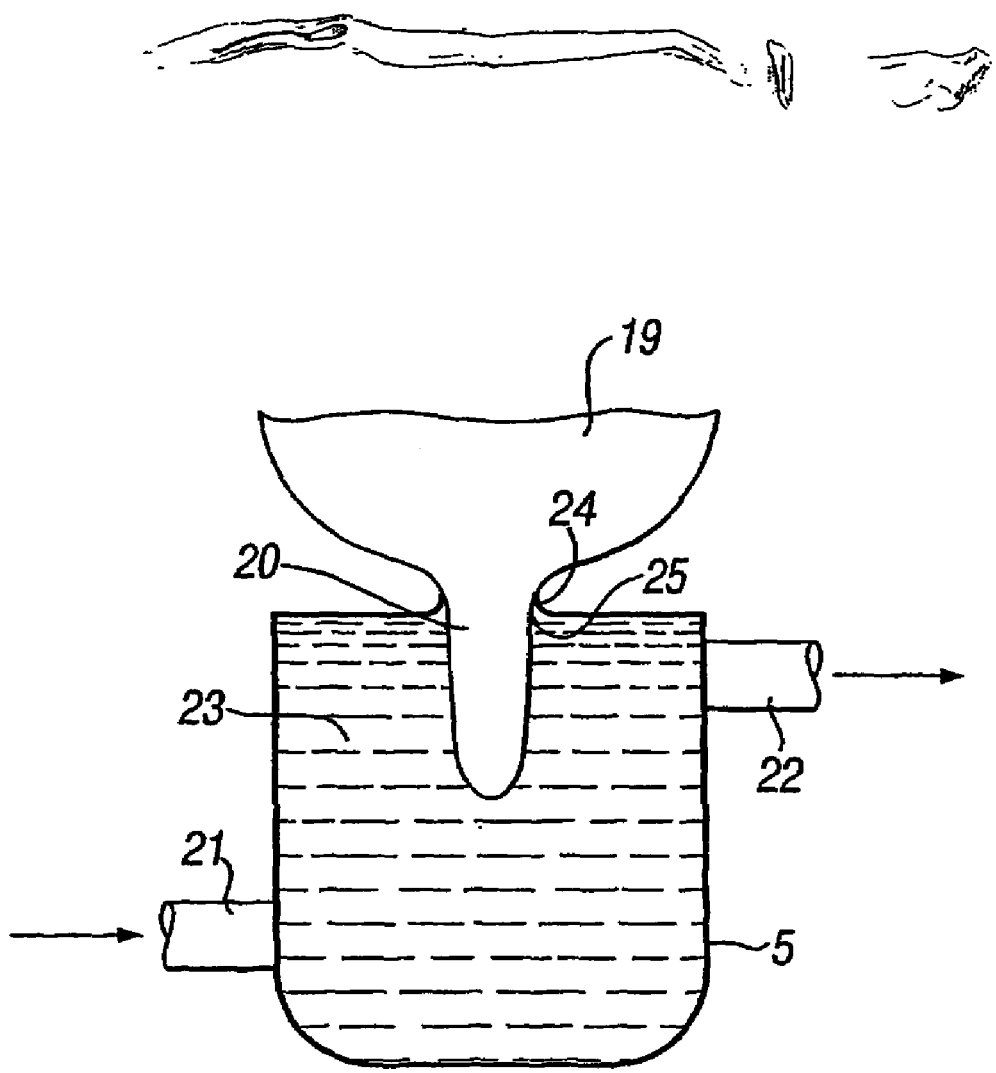
FIG. 2 is a schematic cross-sectional view showing a teat in the course of having a teat dip composition applied by means of a dipping cup.

At the end of a milking procedure, when the teat cups have been detached from the teats, a computer incorporated in the milking installation determines from data stored therein the most appropriate of the available topical compositions for teat treatment to be applied to a teat and the robot arm is controlled to collect the corresponding composition applying member 5 from its standby location and to take the selected member to a position for applying the composition. In the case that one of the spray nozzles 5a, 5b is selected, the nozzle will be taken to a position suitable for spraying the teat to be treated. If one of the dipping cups 5c,5d is selected, the robot arm takes the cup below the udder and lifts it directly below the teat so that the teat is inserted into the opening at the top of the cup and dips into, i.e. becomes immersed in the composition contained in the dipping cup, as illustrated in FIG. 2. Should the wiping rollers 5e be selected the robot arm will collect the rollers from the bracket 10 and take them to a position so that they act on and apply the corresponding topical composition onto the teat being treated. When one teat has been treated the robot arm may take the selected composition applying member 5 directly to another teat, or may return it to its standby location whereafter a decision may be taken as to the appropriate topical composition to be applied to the next teat to be treated and the procedure will then be repeated for that teat.

As mentioned above, the stored data on which decisions are based regarding the composition applying member to be selected for treating a teat may include environmental information and information on the teat skin condition. For gathering the latter information a camera 15 can be provided, as shown mounted on the robot arm 2 in FIG. 1.

The spray nozzles 5a, 5b are depicted in the drawing to have supply hoses 12a, 12b attached, the corresponding liquid teat dips being delivered through these hoses from respective supplies 13a, 13b when these nozzles are used. The dipping cups 5c, 5d are also shown to have delivery tubes 12c, 12d attached so that teat dip compositions can be delivered from respective supplies 13c, 13d to ensure that these dipping cups are maintained sufficiently charged for effective dipping of teats, but this is not essential and there could, for example, be a filling arrangement for delivery of the appropriate teat dip compositions into the dipping cups 5c, 5d when they are disposed in their standby locations. The teat dipping container 5 schematically shown in FIG. 2 with an animal teat 20 inserted therein has an inlet 21 towards the bottom of the container and an outlet 22 near the top of the container. By means of the inlet and outlet, the hoses connected thereto and a circulating device such as a pump, fluid teat dip 23 can be circulated through the container to ensure that the container is filled when a teat is inserted and hence the teat is fully immersed in the teat dip. The container has a sealing lip or rim 24 which surrounds the opening through which the teat is inserted and which seals against the udder 19 at the base of the teat 20 to avoid teat dip being lost through the opening 25 when the teat dip is circulated through the container.

Modifications to the described method and apparatus are of course possible without departing from the scope of the invention as defined by the claims which follow. As an example, instead of the teat dip applying members constituted by the spray nozzles 5a, 5b, dipping cups 5c, 5d and wiping rollers 5e being separate so that the robot arm collects a selected member for teat treatment, a plurality of teat dip applying members may be incorporated in a single unit which is collected from a standby location and taken under the cow, the computer can then be arranged so that the selected member, i.e. dipping cup, spray nozzle or wiping member, is operated to apply the chosen teat dip. Another possibility is to have one teat dip applying member, e.g. a spray nozzle connected to supplies of different teat dips via valves which are operated so that a selected teat dip is applied to a teat.

The invention claimed is:

1. Apparatus for selecting a liquid topical composition capable of forming a topical application on a surface of at least a part of an udder, in particular a teat, of an animal from an available multiplicity of such compositions, each composition of said multiplicity thereof being different than other compositions of said multiplicity thereof, and thereafter applying the selected composition as a topical application on such a surface, said apparatus comprising:

a source providing a respective separate supply of each composition of said multiplicity thereof;

an applicator adapted and arranged for applying a topical composition selected from said multiplicity thereof and received from said source as a topical application on said surface, said applicator normally being located at a predetermined standby location;

a robot arm operably associated with the applicator and actuatable for moving said applicator from said standby location and into a position for applying the selected composition as said topical application on said surface, said predetermined standby location normally being remote from said robot arm, said applicator being completely separated from the robot arm when it is in said standby location; and a control device operatively connected to the robot arm for actuating the latter to cause the robot arm to move the applicator from said standby location and into said position and thereafter cause the applicator to apply the selected composition to said surface, said control device being adapted and arranged to (1) receive and analyze information relating to the condition of said surface and/or the climatic conditions of the animal environment, (2) use such information to select an appropriate topical composition from among said multiplicity thereof to be applied as said topical application on said surface, and (3) manipulate the robot arm accordingly.

2. Apparatus as set forth in claim 1, wherein said liquid topical composition comprises a liquid of relatively low viscosity, a viscous liquid, a greasy liquid, a lotion, a cream, a sun screen, a sprayable liquid or an udder grease.

3. Apparatus as set forth in claim 1, wherein the control device is operable to cause the robot arm to collect the applicator from the standby location and to thereafter move it to said position for applying the composition.

4. Apparatus as set forth in claim 1, comprising a respective separate applicator for each composition included in said multiplicity of compositions, said robot arm being operably associated with said applicators and actuatable for selective and respective individual movement of each said applicator into a position for applying a selected composition to said surface.

5. Apparatus as set forth in claim 4, wherein the robot arm is arranged to collect a selected applicator from its respective predetermined standby location and to return the selected applicator to its standby location when the application of composition to said part of said udder is completed.

6. Apparatus as set forth in claim 5, wherein the robot arm is equipped with a gripping device operable to grasp and to release the selected applicator.

7. Apparatus as set forth in claim 5, wherein two or more of the applicators are incorporated in a common unit which the robot arm collects from a predetermined standby location, the operation of a selected applicator incorporated in the common unit being controlled by the control device for applying the respective composition.

8. Apparatus as set forth in claim 4, wherein said part of said udder is a teat, and at least one of the applicators comprises a container with an opening for a teat to be dipped into the composition contained in the container via said opening.

9. Apparatus as set forth in claim 4, wherein at least one of the applicators comprises a spray nozzle.

10. Apparatus as set forth in claim 4, wherein at least one of the applicators comprises a wiping element for applying the respective composition by wiping said part of said udder.

11. Apparatus as set forth in claim 4, wherein the control device is arranged to select the applicator and thereby the composition to be used for treating said part of said udder of an animal in accordance with data relating to that specific animal.

12. Apparatus as set forth in claim 11, wherein the data relating to the specific animal is gathered from one or more milkings of that animal and stored in a computer.

13. Apparatus as set forth in claim 11, comprising a sensing device for detecting a skin condition of said part of said udder, and wherein the control device is arranged to select an applicator in dependence upon the detected condition of said part of said udder.

14. Apparatus as set forth in claim 13, wherein the sensing device comprises a camera.

15. Apparatus as set forth in claim 14, wherein the control device includes means for analyzing an output from said camera for detecting skin traumas.

16. Apparatus as set forth in claim 4, wherein the control device is arranged to select one of the applicators in accordance with stored data, the stored data comprising information relating to the environment of the animal to which a selected composition is to be applied.

17. Apparatus as set forth in claim 4, wherein said part of said udder is a teat, the robot arm is included in an automatic milking installation, and the robot arm is operable to attach a teat cup to a teat of an animal.

18. A method of applying a liquid topical composition as a topical application on a surface of at least a part of an udder, in particular a teat, of an animal, said method comprising:
providing, at a single milking stall location, a multiplicity of compositions including at least two different compositions chosen from among skin treatment compositions and skin protective compositions;
selecting a liquid topical composition from said multiplicity of such compositions;
applying the selected composition as a topical application on said surface using an applicator charged with the selected composition;
positioning the applicator at a predetermined standby location at said stall, and thereafter moving the applicator into a position for applying the selected composition as a topical application on said surface using a robot arm operatively connected to a control device, said predetermined standby location normally being remote from said robot arm, said applicator being completely separated from the robot arm when it is in said standby location,
said control device being adapted and arranged to (1) receive and analyze information relating to the condition of said surface and/or the climatic conditions of the animal environment, (2) use such information to select an appropriate topical composition from among said multiplicity thereof to be applied as said topical application on said surface, and (3) manipulating the robot arm accordingly so as to cause the robot arm to move the applicator from said standby location and into said position.

19. A method as set forth in claim 18, wherein said liquid topical composition comprises a liquid of relatively low viscosity, a viscous liquid, a greasy liquid, a lotion, a cream, a sun screen, a sprayable liquid or an udder grease.

20. A method as set forth in claim 18, wherein the control device is operable to cause the robot arm to collect the applicator from the standby location and to thereafter move it to said position for applying the composition.

21. A method as set forth in claim 18, wherein said selecting comprises selecting an applicator from among a plurality of said applicators, each said applicator being charged with a different one of the compositions of said multiplicity thereof.

22. A method as set forth in claim 21, wherein the applicators have standby locations and the selection of the applicator to be used to apply a selected composition to said part of said udder is effected by collecting the selected applicator from its standby location using a robot arm.

23. A method as set forth in claim 22, wherein two or more of said applicators are incorporated in a common unit having a standby location and the robot arm is used to collect the common unit from its standby location and move the common unit and thereby a selected applicator into its composition applying location.

24. A method as set forth in claim 21, wherein information relating to individual animals is stored and an applicator is selected for applying a selected composition to said part of said udder of an animal in dependence upon the stored information relating to that specific individual animal.

25. A method as set forth in claim 24, wherein said part of said udder is a teat and the information relating to individual animals includes the skin conditions of the teats of the animals.

26. A method as set forth in claim 25, wherein information relating to the skin condition of a teat of an animal is gathered by means of a camera.

27. A method as set forth in claim 26, wherein the information gathered by the camera is analyzed to detect skin traumas.

28. A method as set forth in claim 21, wherein said part of said udder is a teat and each teat of the udder of an animal has a selected composition applied to it in turn, and immediately prior to the application of a selected composition to a given teat an applicator is selected for application of the selected composition to the given teat.

29. A method as set forth in claim 21, wherein data on environmental conditions is stored and the selection of a composition is dependent on the stored data.

30. A method as set forth in claim 21, wherein said part of said udder is a teat and at least one applicator comprises a container holding one of said compositions, and upon selection of this composition the robot arm takes the container to the teat to be treated and causes the teat to be immersed into the composition held in the container.

31. Apparatus for selecting a liquid topical composition for a topical application on a surface of a teat, of an animal from an available multiplicity of such compositions, and thereafter applying the selected composition as a topical application on such a surface, said apparatus comprising:

a source providing a respective separate supply of each composition of said multiplicity thereof;

a plurality of different applicators, each separately mounted at a side of the milking stall, each applicator adapted to apply a selected topical composition as a topical application on said surface;

a robot arm operably associated with said applicators and actuatable for movement of a selected applicator into a position for applying the selected composition as said topical application on said surface; and a control device operatively connected to the robot arm for actuating the latter and causing the same to locate said selected applicator in said position, said control device (1) receiving and analyzing information relating to the condition of said surface and/or the climatic conditions of the animal environment, (2) using such information to select an appropriate topical composition from among said multiplicity thereof to be applied as said topical application on said surface, and (3) manipulating the robot arm accordingly.

32. A method of applying a liquid topical composition as a topical application on a surface of a teat, of an animal, said method comprising:

providing, at a single milking stall location, a multiplicity of compositions including at least two different compositions chosen from among skin treatment compositions and skin protective compositions;

selecting a liquid topical composition from said multiplicity of such compositions;

applying the selected composition as a topical application on said surface using an applicator selected from a plurality of different applicators each mounted on a side of the milking stall charged with the selected composition; and positioning the selected applicator in a position for applying the selected composition as a topical application on said surface using a control device operatively connected to the robot arm, said control device (1) receiving and analyzing information relating to the condition of said surface and/or the climatic conditions of the animal environment, (2) using such information to select an appropriate topical composition from among said multiplicity thereof to be applied as said topical application on said surface, and (3) manipulating the robot arm accordingly.

* * * * *